United States Patent
Kernwein et al.

(10) Patent No.: US 11,754,725 B2
(45) Date of Patent: Sep. 12, 2023

(54) VEHICLE LOCATION AND CONTROL SYSTEM

(71) Applicant: Westinghouse Air Brake Technologies Corporation, Pittsburgh, PA (US)

(72) Inventors: Jeffrey D. Kernwein, Cedar Rapids, IA (US); Brett Trombo-Somerville, Beausejour (CA); Matthew Vrba, Marion, IA (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 315 days.

(21) Appl. No.: 17/180,078

(22) Filed: Feb. 19, 2021

(65) Prior Publication Data

US 2022/0268946 A1 Aug. 25, 2022

(51) Int. Cl.
*G01S 19/42* (2010.01)
*G01C 21/28* (2006.01)
*H01Q 1/32* (2006.01)
*G01C 21/34* (2006.01)
*B61L 25/02* (2006.01)

(52) U.S. Cl.
CPC ............. *G01S 19/42* (2013.01); *G01C 21/28* (2013.01); *G01C 21/3407* (2013.01); *H01Q 1/3233* (2013.01); *B61L 25/025* (2013.01); *B61L 2205/04* (2013.01)

(58) Field of Classification Search
CPC ..... G01S 19/42; G01C 21/28; G01C 21/3407; G01C 21/34; H01Q 1/3233; B61L 25/025; B61L 2205/04
See application file for complete search history.

(56) References Cited

U.S. PATENT DOCUMENTS 9,846,025 B2 12/2017 Kirchner et al.
11,385,320 B2 * 7/2022 Al-kadi ............... G01S 5/02585
(Continued)

OTHER PUBLICATIONS

Aghili, F et al, "Attitude determination and localization of mobile robots using two RTK GPSs and IMU", The 2009 IEEE/RSJ International Conference on Intelligent Robots and Systems, 2009, pp. 2045-2052, doi: 10.1109/IROS.2009.5354770.URL-https://www.researchgate.net/publication/224091177 [1].

(Continued)

*Primary Examiner* — Anne Marie Antonucci
*Assistant Examiner* — Connor L Knight
(74) *Attorney, Agent, or Firm* — The Small Patent Law Group LLC; Christopher R. Carroll

(57) ABSTRACT

A vehicle location and control system determines a signal-derived separation distance between antennas disposed onboard a vehicle based on signals received by the antennas from an off-board source. The system determines an input-derived separation distance between the antennas based on input offset distances of the antennas from a designated location on the vehicle, determines a difference between the input-derived separation distance and the signal-derived separation distance, and activates or deactivates an automated route identification system that determines which route of several different routes that the vehicle is disposed upon based on the difference that is determined.

17 Claims, 3 Drawing Sheets

(56) References Cited

U.S. PATENT DOCUMENTS

| | | | |
|---|---|---|---|
| 2009/0164067 A1* | 6/2009 | Whitehead | G01S 19/14 |
| | | | 701/41 |
| 2011/0118979 A1* | 5/2011 | Mao | G01C 21/165 |
| | | | 701/532 |
| 2012/0215410 A1 | 8/2012 | McClure et al. | |
| 2013/0261856 A1* | 10/2013 | Sharma | B61L 25/026 |
| | | | 701/19 |
| 2019/0294166 A1* | 9/2019 | Hill | G05D 1/028 |
| 2020/0189629 A1 | 6/2020 | Craven et al. | |
| 2021/0215503 A1* | 7/2021 | Ries | G01C 21/3844 |
| 2021/0318139 A1* | 10/2021 | Loch | G01S 19/21 |

OTHER PUBLICATIONS

Examination Report dated Dec. 21, 2022 for corresponding Australian Application No. 2022200803 (6 pages).
Examination Report dated Mar. 14, 2023 corresponding Australian Application No. 2022200803 (3 pages).

* cited by examiner

VEHICLE LOCATION AND CONTROL SYSTEM

BACKGROUND

Technical Field

The subject matter described herein relates to systems and methods that determine locations of vehicles and that may control movement of the vehicles based on the determined locations.

Discussion of Art

Vehicles use a variety of technologies to determine locations of the vehicles. For example, navigation systems such as global navigation satellite system (GNSS) may be used to determine vehicle locations. These systems may rely on signals communicated from off-board sources (e.g., satellites) to determine the vehicle locations. One example of such a system includes a global navigation satellite system (GNSS) receiver within a precision navigation module (PNM) that can be used to provide highly precise vehicle locations.

Some vehicles may use the locations that are determined for identifying which routes the vehicles are located on. For example, some rail vehicles may determine which track the rail vehicles are on to determine or confirm headings of the rail vehicles, whether movement of the rail vehicles is permitted (e.g., through a switch onto another route segment that may or may not be occupied by another rail vehicle or other object), and the like.

Some current systems can identify a probable route on which a vehicle is located, and an onboard operator of the vehicle is required to confirm or refute whether the vehicle is located on the identified route. But some routes are located too close together for some currently known systems to identify a probable route. The systems can rely on locations of antennas onboard the vehicles that receive the signals used to determine the vehicle locations. These antenna locations may be manually input into the systems, which can introduce uncertainty into the vehicle locations that are determined based on the antenna locations. For example, if a manually input location of an antenna is incorrect by several inches or several centimeters, this error can add linearly to an overall error in the location of the center of the vehicle. While this antenna error may be a small component of the overall error, the antenna error may need to be accounted for so that the systems do not make incorrect decisions on which routes are occupied by the vehicles. For example, due to the uncertainty in the antenna-determined location, the system cannot be sure which route the vehicle is located on as the range of possible antenna locations may place the antenna on any of two or more nearby routes. As a result, any automated system that attempts to determine which route the vehicle is on for controlling movement of the vehicle may not be able to operate.

BRIEF DESCRIPTION

In one embodiment, a method (e.g., for controlling operation, such as movement, of a vehicle) is provided. The method can include determining a signal-derived separation distance between antennas disposed onboard a vehicle based on signals received by the antennas from an off-board source, determining an input-derived separation distance between the antennas based on input offset distances of the antennas from a designated location on the vehicle, determining a difference between the input-derived separation distance and the signal-derived separation distance, and activating or deactivating an automated route identification system that determines which route of several different routes that the vehicle is disposed upon based on the difference that is determined.

A vehicle location and control system also is provided. This system can include one or more processors configured to determine a signal-derived separation distance between antennas disposed onboard a vehicle based on signals received by the antennas from an off-board source. The one or more processors are configured to determine an input-derived separation distance between the antennas based on input offset distances of the antennas from a designated location on the vehicle, and a difference between the input-derived separation distance and the signal-derived separation distance. The one or more processors are configured to activate or deactivate an automated route identification system that determines which route of several different routes that the vehicle is disposed upon based on the difference that is determined.

Another method (for controlling operation and/or movement of a vehicle) is provided. This method includes determining a first distance between antennas onboard a vehicle, determining a second distance between the antennas based off signals received from one or more off-board sources, comparing the first distance with the second distance, and automatically determining which route the vehicle is disposed on based on comparing the first distance with the second distance.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to vehicle location and control systems that can reduce the uncertainties in vehicle locations that are determined using signals received from off-board sources (e.g., satellites, beacons, etc.). Reducing these uncertainties can allow for the systems to determine vehicle locations more precisely, which can be used for automatically determining which routes the vehicle is located on in situations where nearby routes are closely spaced together (e.g., adjacent tracks in a rail yard, adjacent lanes of a road or highway, etc.). While the subject matter described herein may use rail vehicles as one example, not all embodiments of the inventive subject matter are limited to rail vehicles and rail tracks. For example, one or more embodiments can be used to determine locations of automobiles, buses, trucks, etc. (and which lane of a multi-lane road or highway the automobiles, buses, trucks, etc. are located on), locations of agricultural vehicles (and which row or groups of rows of crops are beneath the agricultural vehicles), etc.

Figure 1:
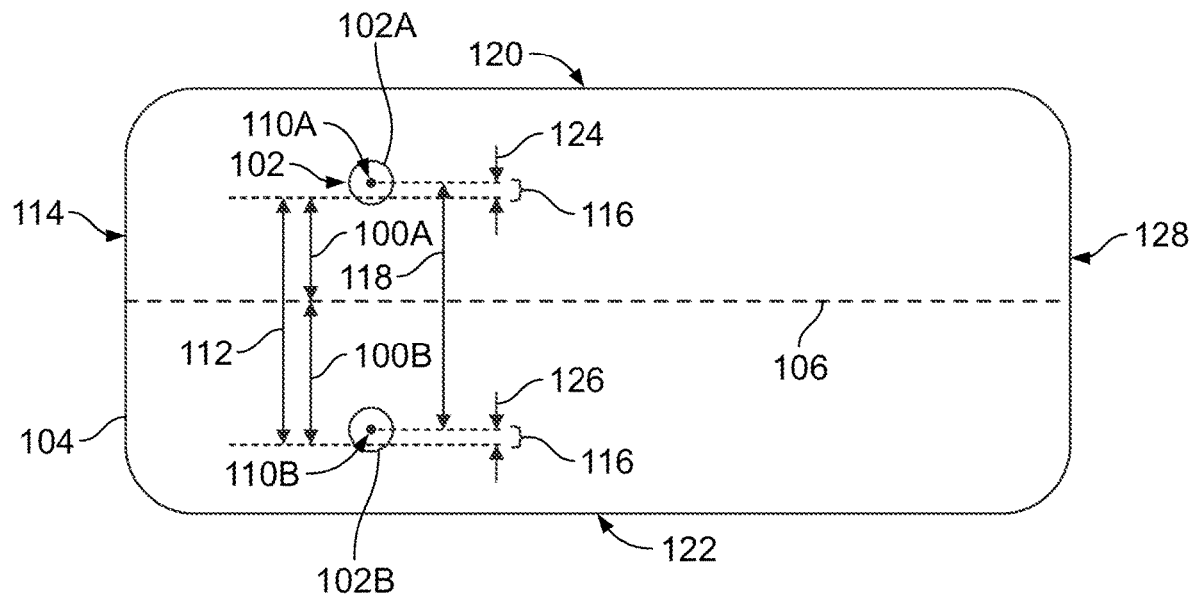
FIG. 1 illustrates one example of a top side of a vehicle.

FIG. 1 illustrates one example of a top side of a vehicle 104. The vehicle can represent a rail vehicle (e.g., locomotive, rail car, transit vehicle, etc.), automobile, truck, bus, mining vehicle, agricultural vehicle, marine vessel, aircraft, or other off-highway vehicle (e.g., a vehicle that is not legally permitted and/or is not designed for travel on public roadways). The vehicle includes location determining systems (shown in FIG. 5) having antennas 102 (e.g., antennas 102A, 102B) that receive signals from one or more off-board sources (shown in FIG. 5). The antennas can be components of a GNSS that receives wireless signals used to determine locations of the vehicle. While two antennas are shown in FIG. 1, optionally, more than two antennas may be used.

The signals received by the antennas can be examined by the controller to determine signal-derived locations 110A, 110B of the antennas. For example, the location determining systems can determine longitudes and latitudes of the antennas based on the received signals as the signal-derived locations of the antennas. The location determining signals can be examined by a controller (shown in FIG. 5) of the vehicle location and control system (also shown in FIG. 5) to determine the signal-derived separation distance 118 between the antennas. For example, the location determining systems that include the antennas and/or the controller can include one or more processors (e.g., one or more microprocessors, one or more field programmable gate arrays, one or more integrated circuits, or the like) that determine geographic locations of the antennas (e.g., longitude, latitudes, and optionally altitudes) and/or the signal-derived separation distance based on the signals received by the antennas. These processors also can determine how far apart the antennas are from each other based on these determined geographic locations.

Optionally, the signal-derived location of one or more of the antennas can be based on additional or other sensor data. This data can be an alternative to or used in addition to the signals received from the off-board sources. The controller can receive sensor data indicative of inertia, accelerations, specific force, angular rate, orientation, etc. measured by a sensor onboard the vehicle. As one example, the sensor can be an inertial measurement unit that outputs sensor data indicative of inertia of the vehicle. This sensor data can be used to determine or refine the location of the vehicle. For example, GNSS signals received by an antenna from satellites can be used to determine a location of the antenna, and this location can be refined by the sensor data.

Another separation distance between the antennas also can be determined. For example, an input-derived separation distance 112 between the antennas can be determined. The input-derived separation distance can be the space or distance between the antennas that is determined on input offset distances 100 (e.g., input offset distances 100A, 100B). Each input offset distance can be the distance from one of the antennas (as manually determined or measured) to a designated location 106. The input offset distances can be manually measured or otherwise determined (e.g., estimated) by an operator, and then input by the operator into the controller. Because the input offset distances are manually measured, the input offset distances may be inaccurate.

The designated location can be on or within the vehicle and can move with the vehicle. For example, the designated location can be a centerline of the vehicle that extends along a top surface of the vehicle from a front or leading end 114 of the vehicle to an opposite rear or trailing end 128 of the vehicle, and that is located midway or halfway between one lateral side 120 of the vehicle and an opposite lateral side 122 of the vehicle. Alternatively, the designated location can be another line or point that is on or inside the vehicle. An operator can measure the distance between each antenna and the designated location as the input offset distance for the respective antenna. The input offset distances can be measured along directions that are normal (e.g., perpendicular) to the designated location on the vehicle, as shown in FIG. 1.

The input-derived separation distance can be determined by the controller. In the illustrated example, the antennas are on opposite sides of the designated location. The controller can determine the input-derived separation distance for these antennas by adding the input offset distances of the antennas with or to each other. Optionally, the antennas may be on the same side of the designated location. For example, both antennas may be between the centerline of the vehicle and one lateral side of the vehicle with neither of the antennas located between the centerline of the vehicle and the other, opposite lateral side of the vehicle. The controller can determine the input-derived separation distance for antennas on the same side of the designated location by determining a difference between the input offset distances. The controller can subtract the smaller of the input offset distances from the larger of the input offset distances, and use this difference as the input-derived separation distance.

A separation distance difference 116 between the input-derived separation distance and the signal-derived separation distance can be determined. For example, the controller can subtract the input-derived separation distance from the signal-derived separation distance (or can subtract the signal-derived separation distance from the input-derived separation distance) to determine the separation distance difference. In the illustrated example, the separation distance difference is shown as two distances 124, 126 (e.g., a first distance 124 between the signal-derived location 110A of one antenna 102A and the location from which the input offset distance 100A was measured for that antenna 102A and a second distance 126 between the signal-derived location 110B of the other antenna 102B and the location from which the input offset distance 100B was measured for that antenna 102B). The separation distance difference can be calculated as a sum of these two distances 124, 126. The input-derived separation distance can be subtracted from the signal-derived separation distance to determine the separation distance difference. Alternatively, the signal-derived separation distance can be subtracted from the input-derived separation distance to determine the separation distance difference.

Figure 2:
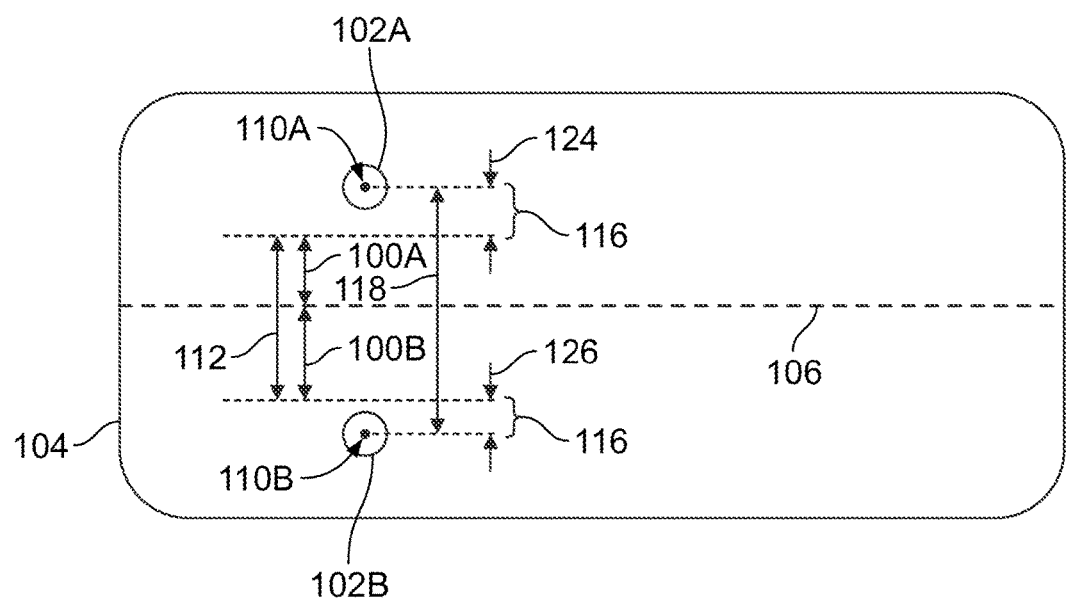
FIG. 2 illustrates another example of the top side of the vehicle shown in FIG. 1.

FIG. 2 illustrates another example of the top side of the vehicle shown in FIG. 1. In this example, the separation distance difference 116 is larger than the separation distance difference 116 shown in FIG. 1. The larger separation distance difference can be due to one or more of the input-offset distances 100A and/or 100B in FIG. 2 being larger or smaller than the corresponding input-offset distances 100A and/or 100B in FIG. 1. For example, the error in the measurement of the input-offset distance for one or more antennas may be larger in the example of FIG. 2 than the example of FIG. 1. This can result in the input-derived separation distance 112 in the example of FIG. 2 being larger than the input-derived separation distance 112 in the example of FIG. 1. As the input-derived separation distance increases, uncertainty in the location of the vehicle increases. As the uncertainty in the location of the vehicle increases, the vehicle location and control system may no longer be able to determine (with at least a threshold confidence level) which route the vehicle is located on.

Figure 3:
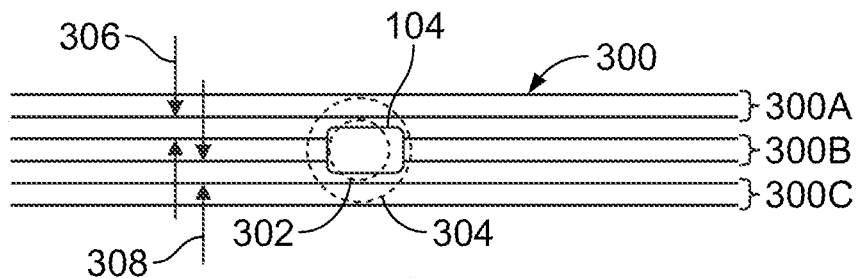
FIG. 3 illustrates one example of several nearby or adjacent routes.

With continued reference to the examples shown in FIGS. 1 and 2, FIG. 3 illustrates one example of several nearby or adjacent routes 300 (e.g., routes 300A-C). The routes can represent different tracks, different lanes, different crop rows, different paths, or the like. The vehicle is disposed on the middle route. The vehicle location and control system can determine a range 302 or 304 of locations of the vehicle based on the signal-derived location 110 of at least one of the antennas 102. For example, the first range of locations can represent a set of potential locations of an antenna based on several samples of the signal-derived location of that antenna. The signal-derived location may not be a precise, single point location due to uncertainties in calculation of the signal-derived location. These uncertainties can be due to the number of samples of signals received by the antenna (s) from off-board sources, the number of off-board sources from which signals are received by the antenna(s), and/or the magnitude of the separation distance difference 116. For example, as the number of samples of the signals increases, the number of off-board sources from which signals are received increases, and/or the magnitude of the separation distance difference decreases, the size of the range of locations of the vehicle decreases. Conversely, as the number of samples of the signals decreases, the number of off-board sources from which signals are received decreases, and/or the magnitude of the separation distance difference increases, the size of the range of locations of the vehicle decreases.

In the illustrated example, the smaller range 302 of locations of the vehicle can be determined by the controller when the separation distance difference is smaller (e.g., as shown in FIG. 1) while the larger range 304 of locations of the vehicle can be determined by the controller when the separation distance difference is larger (e.g., as shown in FIG. 2). The smaller range of vehicle locations can be achieved when the operator-provided input offset distances of the antennas are closer to the true or actual distances of the antennas from the designated location, while the larger range of vehicle locations can be achieved when the operator-provided input offset distances of the antennas are farther from the true or actual distances of the antennas from the designated location.

Several samples of the antenna locations 110A, 110B, several calculations of the signal-derived separation distance 118, and/or several calculations of the separation distance difference 116 can be performed. For example, on a regular or periodic basis, on an irregular or aperiodic, and/or on an on-demand basis (e.g., responsive to input received from an operator), different measurements of the locations 110A, 110B, several calculations of the signal-derived separation distance 118, and/or several calculations of the separation distance difference 116 can be performed. In one example, an average, median, or other statistical calculation of the separation distance difference can be determined by the controller and used to determine the size of the range of vehicle locations. For example, larger separation distance differences can be associated (e.g., via a look-up table, formula, or the like) with larger ranges of vehicle locations, while smaller separation distance differences can be associated with smaller ranges of vehicle locations.

The range of vehicle locations (or the average, median, or other calculation of the separation distance difference) can be compared with a threshold difference. If the range (or average, median, or other calculation of the separation distance difference) exceeds the threshold difference, then one or more features of the vehicle location and control system may be deactivated. Otherwise, these features of the vehicle location and control system may be activated or remain activated.

For example, the vehicle location and control system may include an automated route identification system (shown in FIG. 5) that determines which route of several different routes that the vehicle is disposed upon. If the range of vehicle locations (or the average, median, or other calculation of the separation distance difference) is larger than the threshold difference, then the controller of the vehicle location and control system may not be able to determine which route the vehicle is located on. With respect to the example shown in FIG. 3, the smaller range of vehicle locations can be used to determine that the vehicle is located on the route 300B and not the route 300A or the route 300C. The smaller range of vehicle locations does not include, extend over, or encompass the routes 300A, 300C, but only includes, extends over, or encompasses the route 300B. Accordingly, the controller of the vehicle location and control system can automatically determine (e.g., without operator confirmation or identification) that the vehicle is located on the route 300B. In contrast, the larger range of vehicle locations may not be able to be used to determine which route the vehicle is located on. The larger range of vehicle locations includes, extends over, or encompasses multiple routes 300. Accordingly the controller may not be able to automatically determine (e.g., without operator confirmation or identification) which of the routes the vehicle is located on.

In one embodiment, the threshold difference is based on one or more route separation distances 306, 308. The route separation distances can be the shortest distances between neighboring routes (e.g., routes having no other route between the routes), such as the shortest separation distance between the neighboring routes within a threshold distance of the vehicle (e.g., within thirty feet or ten meters). The route separation distances for different routes and different locations along the routes can be stored in a memory or database of the vehicle location and control system (shown in FIG. 5). The controller can determine the route separation distances for a current location of the vehicle (which can be the signal-derived location of at least one of the antennas) and use one or more of the route separation distances as the threshold distance. The controller can compare the separation distance difference with the route separation distances to determine whether the route on which the vehicle is located can be automatically determined. This can result in the threshold difference (to which the separation distance different is compared) to vary or change as the vehicle moves along routes. The availability or usage of the automated route identification can then accordingly change as the vehicle moves along routes.

For example, for smaller route separation distances, automated route identification may be used for smaller ranges of vehicle locations but may not be used for larger ranges of vehicle locations. Conversely, for larger route separation distances, automated route identification may be used for larger (but not all) ranges of vehicle locations. In FIG. 3, automated route identification may be available for determining which route the vehicle is located on while the range of vehicle locations is the smaller range 302, but may not be available for the larger range 304. Specifically, the smaller range 302 does not overlap or extend over the routes 300A, 300C, but only the route 300B. Conversely, the larger range 304 does overlap or extend over the routes 300A, 300C.

Figure 4:
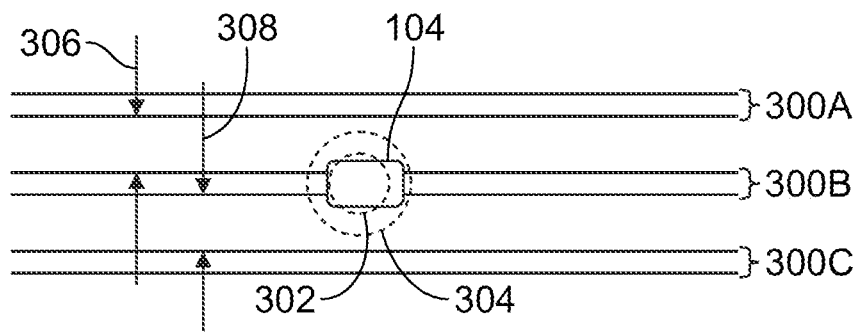
FIG. 4 illustrates another example of the routes shown in FIG. 3.

FIG. 4 illustrates another example of the routes shown in FIG. 3. In FIG. 4, the routes are separated by larger route separation distances. These route separation distances are large enough that neither the small nor the large ranges of vehicle locations overlaps or extends over any route 300A, 300C other than the route 300B. Accordingly, automated route identification can be used for both the small and large ranges of vehicle locations.

Figure 5:
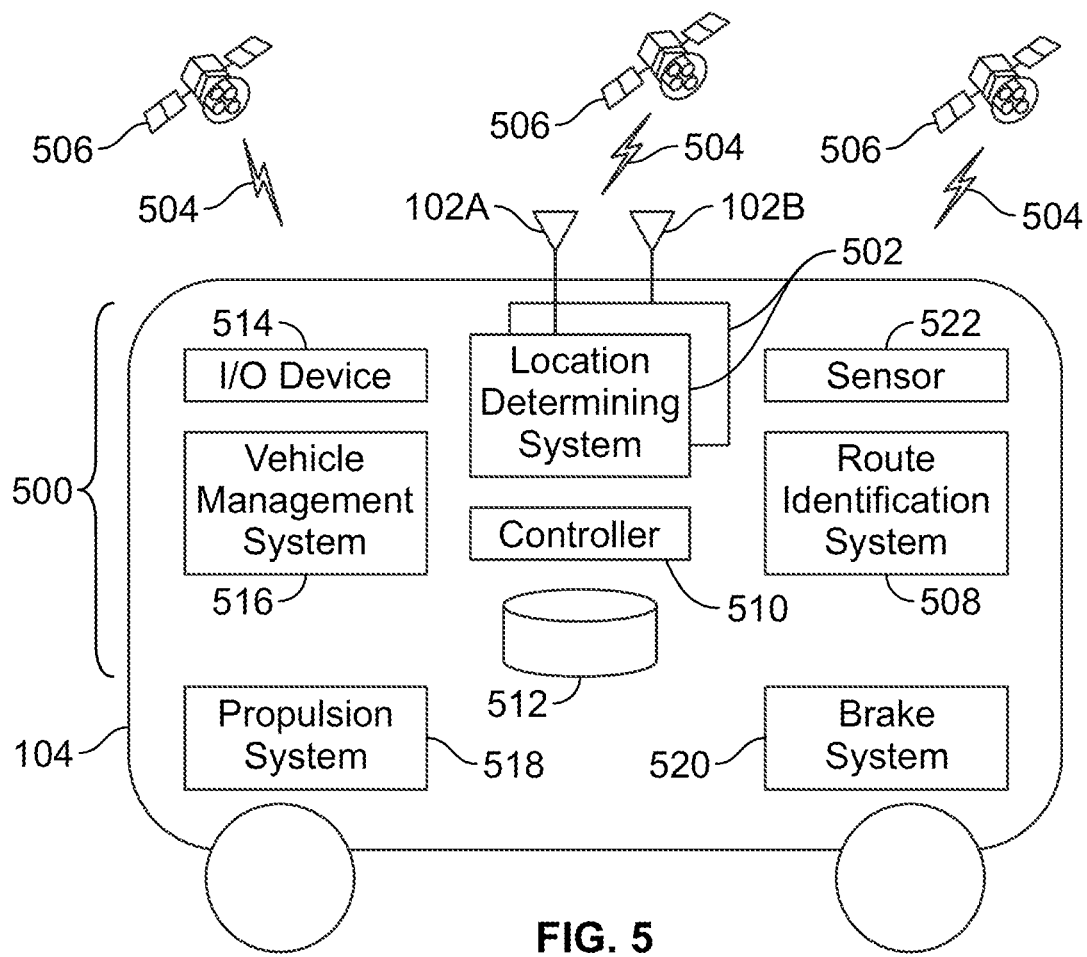
FIG. 5 illustrates one example of a vehicle location and control system.

FIG. 5 illustrates one example of the vehicle location and control system 500. The vehicle location and control system may be disposed entirely or at least partially onboard the vehicle. For example, all components of the vehicle location and control system may be onboard the vehicle, or at least one (but fewer than all) components of the vehicle location and control system may be disposed onboard the vehicle. While the vehicle is shown as a single vehicle, the vehicle optionally can represent a vehicle system formed of two or more vehicles. These vehicles can be mechanically coupled with each other to travel together along a route. Optionally, two or more vehicles in the vehicle system may not be mechanically coupled but may be logically coupled in that the vehicles communicate with each other to coordinate movements so that the vehicles move together along the routes as a vehicle system (e.g., as a convoy).

The vehicle location and control system includes the location determining systems 502 described above. The location determining systems can represent one or more GNSS, such as one or more GPS receivers and/or PNMs. The location determining systems can receive the wireless signals 504 communicated from the off-board sources 506, such as satellites that broadcast the signals to permit the location determining systems to identify locations of the antennas that receive the signals. Optionally, the off-board sources may be ground-based beacons that broadcast the signals (e.g., for use in a wireless triangulation system).

As described above, the vehicle location and control system also can include a sensor 522 that outputs sensor data indicative of movement of the vehicle. This sensor can be an inertial measurement unit, an accelerometer, or the like. The controller can use this sensor data to determine or refine the signal-derived location of one or more of the antennas.

The vehicle location and control system includes the route identification system 508, which can determine which route the vehicle is located on (as described above). The route identification system can include hardware circuitry that includes and/or is connected with one or more processors that access different route locations or layouts as stored in the memory or database 510 (e.g., a tangible and non-transitory computer readable medium, such as a computer memory). The route identification system also can obtain the separation distances between the routes and/or the threshold differences described above from the memory or database. The route identification system can automatically determine which route the vehicle is located on when the separation distance difference does not exceed the threshold difference, as described above. The route identification system can communicate the identified route to the controller 512, which also can represent hardware circuitry that includes and/or is connected with one or more processors. Optionally, if the separation distance difference exceeds the threshold difference, then the route identification system may be deactivated or otherwise may not identify which route the vehicle is located on. The identification of a route can be obtained by the controller and/or other components of the vehicle by receiving operator input via an input/output device 514 ("I/O Device" in FIG. 5). The input/output device can represent one or more buttons, switches, levers, keyboards, touchscreens, microphones, or the like. The operator can use the input/output device to identify the route that the vehicle is located on (e.g., by a unique route identifier) while the route identification system is deactivated or otherwise unable to automatically identify the route without operator intervention.

The vehicle location and control system optionally includes a vehicle management system 516. The management system represents hardware circuitry that includes and/or is connected with one or more processors that perform the operations of the energy management system as described herein. One or more processors may be shared processors that perform one or more operations of two or more of the location determining system(s), the route identification system, the controller, and/or the management system. Optionally, each of the location determining system(s), the route identification system, the controller, and the management system include separate processor(s) that perform the operations of the respective system or controller.

The management system can control movement of the vehicle. For example, the management system can communicate signals to a propulsion system 518 and/or brake system 520 of the vehicle to control movement of the vehicle. The propulsion system can represent one or more engines, motors, or the like, that operate to propel the vehicle. The brake system can represent one or more friction brakes, air brakes, regenerative brakes (e.g., as one or more motors which also may be part of the propulsion system), or the like, that operate to slow or stop movement of the vehicle.

In one example, the management system can be a safety-critical overlay system that enforces movement authorities, speed restrictions, work zones, and switch positioning to reduce the potential for vehicle accidents. The management system can communicate with an off-board positive control system (e.g., a back office system or server). Such a positive control system can send signals to the management system to indicate whether the vehicle can enter into one or more route segments, travel at or above designated speeds, or the like. Absent receiving a signal from the positive control system, the management system can automatically operate to stop or prevent movement of the vehicle that is not permitted by the positive control system. For example, unless a signal is received by the management system that indicates the vehicle can travel enter into an upcoming route segment, the management system will control the propulsion system and/or brake system to prevent entry of the vehicle into the route segment (even if this includes overriding or disregarding operator control that would cause the vehicle to enter into the route segment). Optionally, the management system can communicate with an off-board negative control system (e.g., a back office system or server). Such a negative control system can send signals to the management system to indicate whether the vehicle is not permitted to enter into one or more route segments, travel at or above designated speeds, or the like. Absent receiving a signal from the negative control system, the management system does not prevent any movement of the vehicle. But, responsive to receiving a signal from the negative control system, the management system can automatically operate to stop or prevent movement of the vehicle that is not permitted by the negative control system.

In order for the management system to operate to control movement of the vehicle, the management system may require identification of which route the vehicle is located on. For example, in order for the management system to be able to determine whether the vehicle can or cannot enter into an upcoming route segment, the management system may need to know whether the vehicle is on a route that includes the upcoming route segment. As another example, in order for the management system to be able to determine whether the vehicle can travel a certain speed on a route, the management system may need to know whether the vehicle is on a route having a reduced speed limit (e.g., due to maintenance on the route). The management system can receive the identification of the route that the vehicle is on from an operator or from the route identification system. The management system can then automatically control movement of the vehicle based on the identified route.

Figure 6:
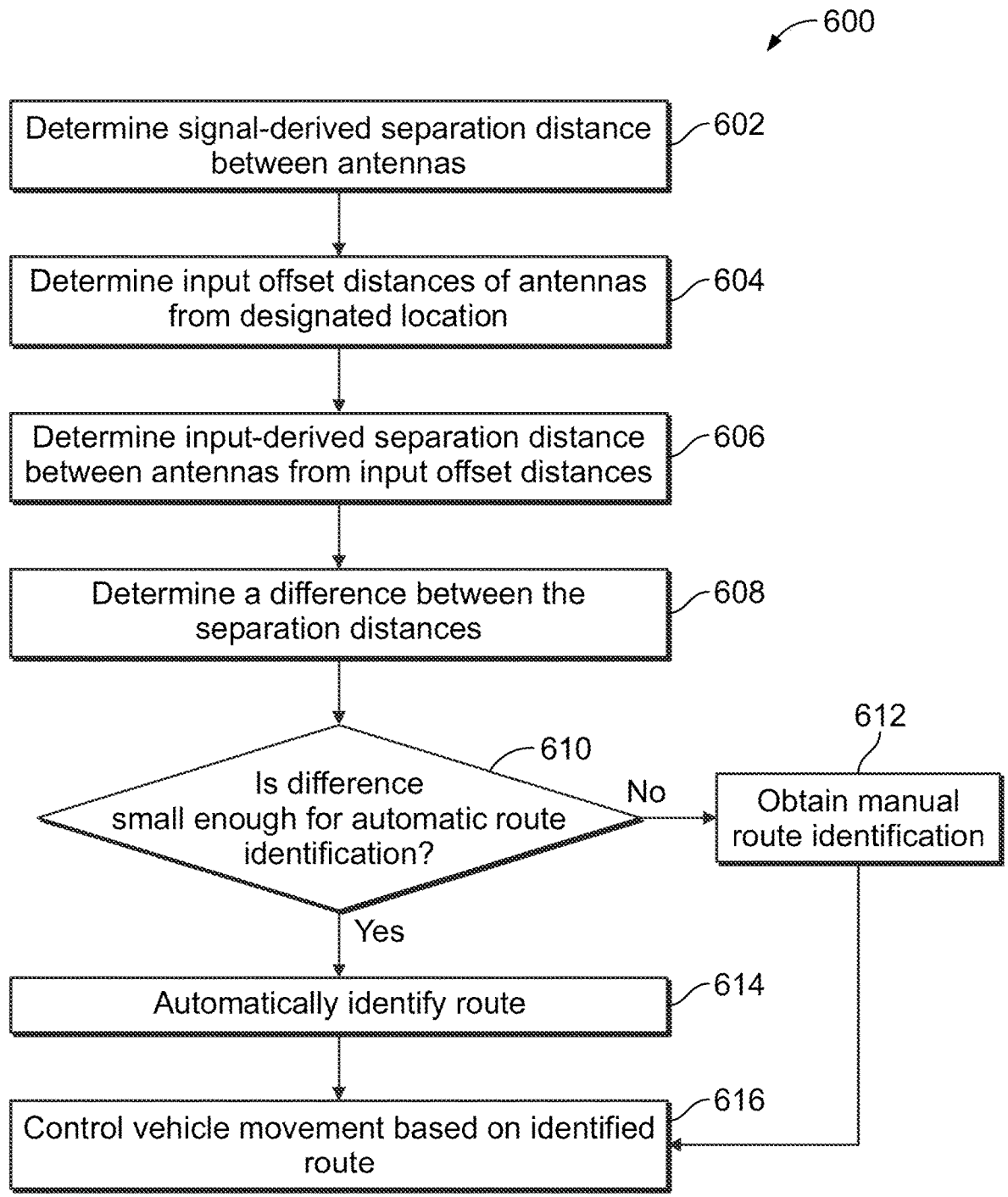
FIG. 6 illustrates a flowchart of one example of a method for determining a location of a vehicle and controlling movement of the vehicle.

FIG. 6 illustrates a flowchart of one example of a method 600 for determining a location of a vehicle and controlling movement of the vehicle. The location of the vehicle can be an identification of which route the vehicle is located on. The method can represent operations performed by the vehicle location and control system described herein. At 602, a signal-derived separation distance between antennas is determined. This distance can be determined by identifying locations of the antennas from signals received from off-board sources (e.g., GPS signals) and calculating how far the antennas are from each other using these locations. At 604, input offset distances of the antennas from a designated location are determined. These distances can be manually measured and input by an operator. At 606, an input-derived separation distance between the antennas is determined. This distance can be calculated using the input offset distances, such as by adding the input offset distances (when the antennas are on opposites or different sides of the designated location) or determining a difference between the input offset distances (when the antennas are on the same side of the designated location).

At 608, a difference between the separation distances is determined. For example, a magnitude (e.g., absolute value) of the separation distance determined at 602 subtracted from the separation distance determined at 606 can be calculated. Optionally, several differences between the separation distances can be calculated. Several samples of each of the separation distances can be obtained, and the differences between the different samples can be calculated.

At 610, a determination is made as to whether the difference determined at 608 is small enough for automated route identification. For example, if the difference is no larger than a threshold difference, then the route on which the vehicle is located may be automatically determined, as described above. As a result, flow of the method can proceed toward 614. But, if the difference is larger than the threshold difference, then the route on which the vehicle is located may not be automatically determined, as described above. As a result, flow of the method can proceed toward 612.

At 612, the route is manually identified. For example, the route on which the vehicle is disposed may be identified by an operator. At 614, the route on which the vehicle is disposed may be automatically identified. For example, the location or range of locations of one or more of the antennas (as determined from signals received by one or more of the antennas, such as GPS signals) may be compared (e.g., by the route identification system) with a layout or other geographical locations of the route. If the antenna location or range of locations overlaps the locations of the route, then the route can be identified as the route on which the vehicle is located.

At 616, movement of the vehicle is controlled based on the route that is identified. For example, the vehicle may be stopped to prevent the vehicle from entering into an occupied route segment, the speed of the vehicle may be reduced to prevent the vehicle from moving faster than a designated speed limit of the route, etc. Flow of the method can terminate or can return to one or more prior operations, such as 602.

In one embodiment, a method (e.g., for controlling operation, such as movement, of a vehicle) is provided. The method can include determining a signal-derived separation distance between antennas disposed onboard a vehicle based on signals received by the antennas from an off-board source, determining an input-derived separation distance between the antennas based on input offset distances of the antennas from a designated location on the vehicle, determining a difference between the input-derived separation distance and the signal-derived separation distance, and activating or deactivating an automated route identification system that determines which route of several different routes that the vehicle is disposed upon based on the difference that is determined.

The method optionally can include receiving sensor data from a sensor onboard the vehicle, the sensor data indicative of movement of the vehicle, and determining a signal-derived location of at least one of the antennas using the sensor data. The signal-derived separation distance of the at least one of the antennas can be determined using the signal-derived location. Each of the input offset distances of the antennas can be a distance between one of the antennas and the designated location on the vehicle. The input offset distances can be measured along directions that are normal to the designated location on the vehicle.

Optionally, the input offset distances of the antennas can be received from operator-provided input received by an input device. The signal-derived separation distance can be determined from signal-derived locations of the antennas that are determined from the signals. The signals can be GNSS signals received from one or more satellites as the off-board source.

The method optionally can include controlling movement of the vehicle based on the route on which the vehicle is determined to be located. The method also may include determining a route separation distance between neighboring routes, where the automated route identification system is activated or deactivated based on a comparison between the route separation distance and the difference that is determined. The automated route identification system can be activated responsive to the route separation distance being larger than the difference that is determined. Optionally, the automated route identification system can be deactivated responsive to the route separation distance being no larger than the difference that is determined.

A vehicle location and control system also is provided. This system can include one or more processors configured to determine a signal-derived separation distance between antennas disposed onboard a vehicle based on signals received by the antennas from an off-board source. The one or more processors are configured to determine an input-derived separation distance between the antennas based on input offset distances of the antennas from a designated location on the vehicle, and a difference between the input-derived separation distance and the signal-derived separation distance. The one or more processors are configured to activate or deactivate an automated route identification system that determines which route of several different routes that the vehicle is disposed upon based on the difference that is determined.

Optionally, each of the input offset distances of the antennas can be a distance between one of the antennas and the designated location on the vehicle. The one or more processors can be configured to determine the signal-derived separation distance from signal-derived locations of the antennas that based on the signals. The one or more processors can be configured to control movement of the vehicle based on the route on which the vehicle is determined to be located. The one or more processors can be configured to determine a route separation distance between neighboring routes, where the one or more processors can be configured to activate or deactivate the automated route identification system based on a comparison between the route separation distance and the difference that is determined.

Another method (for controlling operation and/or movement of a vehicle) is provided. This method includes determining a first distance between antennas onboard a vehicle, determining a second distance between the antennas based off signals received from one or more off-board sources, comparing the first distance with the second distance, and automatically determining which route the vehicle is disposed on based on comparing the first distance with the second distance.

The first distance optionally can be determined from manually measured distances of the antennas from a designated location and the second distance is determined from the signals received from one or more satellites as the one or more off-board sources. The method also can include determining whether a difference between the first distance and the second distance exceeds a threshold difference, where automatically determining which route the vehicle is disposed on occurs responsive to the difference not exceeding the threshold difference. The method optionally can include automatically changing movement of the vehicle based on determining which route the vehicle is disposed on.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    determining a signal-derived separation distance between antennas disposed onboard a vehicle based on signals received by the antennas from an off-board source;
    determining an input-derived separation distance between the antennas based on input offset distances of the antennas from a designated location on the vehicle;
    determining a difference between the input-derived separation distance and the signal-derived separation distance;
    activating or deactivating an automated route identification system that determines which route of several different routes that the vehicle is disposed upon based on the difference between the input-derived separation distance and the signal-derived separation distance that is determined; and
    controlling movement of the vehicle based on the route on which the vehicle is determined to be located.

2. The method of claim 1, further comprising:
    receiving sensor data from a sensor onboard the vehicle, the sensor data indicative of movement of the vehicle; and
    determining a signal-derived location of at least one of the antennas using the sensor data,
    wherein the signal-derived separation distance between the antennas is determined using the signal-derived location.

3. The method of claim 1, wherein each of the input offset distances of the antennas is a distance between one of the antennas and the designated location on the vehicle.

4. The method of claim 3, wherein the input offset distances are measured along directions that are normal to the designated location on the vehicle.

5. The method of claim 1, wherein the input offset distances of the antennas are received from operator-provided input received by an input device.

6. The method of claim 1, wherein the signal-derived separation distance is determined from signal-derived locations of the antennas that are determined from the signals.

7. The method of claim 1, wherein the signals are global navigation satellite system signals received from one or more satellites as the off-board source.

8. The method of claim 1, further comprising:
determining a route separation distance between neighboring routes, wherein the automated route identification system is activated or deactivated based on a comparison between the route separation distance and the difference between the input-derived separation distance and the signal-derived separation distance that is determined.

9. The method of claim 8, wherein the automated route identification system is activated responsive to the route separation distance being larger than the difference between the input-derived separation distance and the signal-derived separation distance that is determined.

10. The method of claim 8, wherein the automated route identification system is deactivated responsive to the route separation distance being no larger than the difference between the input-derived separation distance and the signal-derived separation distance that is determined.

11. A device, comprising:
one or more processors configured to determine a signal-derived separation distance between antennas disposed onboard a vehicle based on signals received by the antennas from an off-board source, the one or more processors configured to determine an input-derived separation distance between the antennas based on input offset distances of the antennas from a designated location on the vehicle, the one or more processors configured to determine a difference between the input-derived separation distance and the signal-derived separation distance, the one or more processors configured to activate or deactivate an automated route identification system that determines which route of several different routes that the vehicle is disposed upon based on the difference between the input-derived separation distance and the signal-derived separation distance that is determined, the one or more processors configured to control movement of the vehicle based on the route on which the vehicle is determined to be located.

12. The device of claim 11, wherein each of the input offset distances of the antennas is a distance between one of the antennas and the designated location on the vehicle.

13. The device of claim 11, wherein the one or more processors are configured to determine the signal-derived separation distance from signal-derived locations of the antennas that are based on the signals.

14. The device of claim 11, wherein the one or more processors are configured to determine a route separation distance between neighboring routes, wherein the one or more processors are configured to activate or deactivate the automated route identification system based on a comparison between the route separation distance and the difference between the input-derived separation distance and the signal-derived separation distance that is determined.

15. A method comprising:
determining a first distance between antennas onboard a vehicle;
determining a second distance between the antennas based off signals received from one or more off-board sources;
comparing the first distance with the second distance;
automatically determining which route the vehicle is disposed on based on comparing the first distance with the second distance; and
automatically changing movement of the vehicle based on determining which route the vehicle is disposed on.

16. The method of claim 15, wherein the first distance is determined from manually measured distances of the antennas from a designated location and the second distance is determined from the signals received from one or more satellites as the one or more off-board sources.

17. The method of claim 15, further comprising:
determining whether a difference between the first distance and the second distance exceeds a threshold difference,
wherein automatically determining which route the vehicle is disposed on occurs responsive to the difference between the first distance and the second distance not exceeding the threshold difference.

* * * * *